3,084,036
HERBICIDAL COMPOSITION AND METHOD EMPLOYING ALLYL HYDRAZINE

Melvin J. Josephs, Midland, Mich., assignor to The Dow Chemical Company, Midland, Mich., a corporation of Delaware
No Drawing. Filed Feb. 5, 1959, Ser. No. 791,287
5 Claims. (Cl. 71—2.7)

This invention relates to herbicides and is particularly concerned with a composition for and method of killing aquatic plants. The expression "aquatic plants" as herein employed refers to vegetative organisms normally growing in water in which the leaf and stem parts are largely submerged. The expression is inclusive of water plants such as Ceratophyllum spp. and Salvinia spp. which are normally free-floating in their environment as well as species which are typically rooted, such as Vallisneria spp. (tapegrass), Potamogeton spp. (pondweed) and Lysimastrum spp., and species which appear to grow normally in all respects either free-floating or rooted, such as Cabomba spp. and Anacharis spp.

Aquatic plants growing out of place are commonly called weeds, and millions of dollars are expended annually for their control. In irrigation ditches, canals, lakes, rivers and streams of pleasure and commerce, these plants hinder the flow of water and cause excessive sedimentation. Further, such growth causes high water loss from evaporation, and interferes with navigation. Mechanical operations such as dredging, chaining, burning, and mowing are among the means by which control is attempted. Limited efforts have been made at chemical control. The shortcomings of the latter methods have included superficial burning of foliage without killing of the plants, with the result that regrowth of the denuded plants takes place rapidly. Further, many of the proposed materials are as toxic to terrestrial plants as they are to aquatic plants so that the treated water is unsuited for irrigation of terrestrial crop plants or injurious to littoral vegetation which may be desirable for erosion control and for other reasons. Also, many of the chemicals are specific in their action and control only a few species, thus leading to increased growth activity on the part of unaffected plants.

It is an object of the present invention to provide a new and improved method for the control and suppression of the growth of aquatic plants. Another object is the provision of a method for the treatment of the water environing the submerged portions of aquatic plants in a stream, pond, or lake, to control the growth of the plants. A further object is the provision of a method which will control the growth of a large variety of aquatic plant species. An additional object is the provision of novel compositions to be employed in the new methods for suppressing the growth or the killing of aquatic plants. Other objects will become apparent from the following specification and claims.

According to the present invention it has been found that allyl hydrazine is very toxic to aquatic plants when such compound or a composition in which it is employed is introduced into water environing the submersed portions of aquatic plants. Allyl hydrazine is a colorless liquid soluble in many common organic solvents and of very low solubility in water. The compound is readily and conveniently adapted to be distributed in water to control aquatic weeds. It is among the advantages of the present invention that the compound accomplishes a quick kill of the stems and leaves of aquatic plants, accompanied by the control in a short period of time of the roots of rooted species. A particular advantage of the present invention is the wide range of water temperatures over which the compound is effective. Thus, the treatment may be carried out at almost any water temperature which will permit the growth and development of aquatic plants. A still further advantage of the methods and compositions of the present invention is their ability to control a wide variety of aquatic plants.

The distribution in water environing the submersed portions of growing aquatic plants of an amount and dosage of allyl hydrazine effective to kill the plants is essential for the practice of the present invention. In general, good results are obtained when the compound is distributed in water adjacent to growing aquatic plants in an amount of from about 1 to 100 or more parts by weight per million parts by weight of the environing water. The exact amount or concentration to be employed is dependent upon several factors such as water temperature, turbidity, the bulk and density of the plant mass to be treated, and whether the exposure is to be carried out in a moving stream such as a river or canal or in standing water such as a pond. In standing water, good results are obtained when employing minimal concentrations of the compound. In moving streams, somewhat higher concentrations may be required to provide for adequate contacting of the undesired plant growth with a herbicidal amount of the allyl hydrazine compound.

The method of the present invention may be carried out by distributing a growth-inhibiting amount of the allyl hydrazine compound or a composition containing the compound in water adjacent to the growing plants to be killed. In such usage, the compound may be modified with one or more of a plurality of additaments or herbicide adjuvants, including water or inert organic solvents, surface active dispersing agents or finely divided solids and sticking and adhering agents. Preferred compositions of the present invention comprise emulsifiable liquid concentrates, wettable powder concentrates, and granular or pellet compositions. Such compositions are readily and conveniently adapted to be distributed in water adjacent to aquatic plants to provide, in the water, growth-inhibiting concentrations of the toxicant.

The exact concentration of the allyl hydrazine compound to be employed in compositions for the treatment of aquatic plant infested loci is not critical and may vary provided that the required concentration of effective agent is supplied in the water adjacent to and in contact with at least part of each plant to be controlled. The concentration of toxicant in liquid compositions employed to supply the desired dosage generally is from about 1 to 75 percent by weight of total composition. In solid compositions such as dusts or pellets, the concentration of toxicant may be from about 1 to about 30 percent by weight. In compositions to be employed as concentrates, the toxicant oftentimes is present in a concentration of from 5 to 95 percent by weight.

Liquid compositions containing the desired amount of the allyl hydrazine compound may be prepared by dissolving the toxicant compound in an organic liquid, preferably a hydrocarbon such as toluene, xylene, and petroleum distillates, or a mixture of one or more such liquids, or by dispersing the toxicant compound in water with the aid of a suitable surface active dispersing agent. The aqueous composition may contain one or more water-immiscible solvents for the allyl hydrazine compound. In such compositions the carrier comprises an aqueous emulsion, that is, a mixture of water-immiscible solvent, emulsifying agent, and water. The compositions should preferably be characterized by a density only slightly greater than water, and should contain sufficient of the dispersing and emulsifying agent to make the composition self-dispersing in water and thus give an initial dispersion in water which breaks to permit the settling out of a solution of the allyl hydrazine compound.

In the preparation of solid compositions, the allyl hydrazine compound is dispersed in and on a particulate material as a carrier therefor, which material may be a finely divided inert solid such as bentonite, fuller's earth, attapulgite and other clays. Such compositions may contain other finely divided solid carriers such as talc and chalk. In such operations, the solid carrier may be mixed and mechanically ground with the allyl hydrazine compound and surface-active dispersing agents. The resulting dusts and powders may be used directly, or may be compressed into pellets, which may or may not be further treated, as, for example, by coating with a water repellent material. Such granular or pellet compositions should be characterized by a density somewhat greater than that of water.

The surface active dispersing agents are generally employed in the amount of from about one to about thirty parts per hundred parts by weight of the combined weight of the agent and the allyl hydrazine compound in the composition. Dispersing and emulsifying agents which may be employed in the compositions include the condensation products of alkylene oxides with phenols and organic acids, alkyl aryl sulfonates, polyoxyalkylene derivatives of sorbitan esters, complex ether alcohols, mahogany soaps, and the like.

The method of the present invention is carried out by dispersing a growth-inhibiting amount of the allyl hydrazine into the water environing the submersed portions of the plants in a pond, lake, river, canal, stream, ditch, or other watercourse or body of water. This is readily accomplished by introducing the allyl hydrazine compound or a composition containing said compound into water above a plant mass so as to permit its dispersion in the water adjacent to and in contact with the growing plants. The introduction of the toxicant into the water adjacent aquatic weeds may be accomplished conveniently by spraying, sprinkling, or scattering the composition onto or beneath the surface of the water or by metering the composition into the vortex of a rapidly turning propeller to obtain maximum distribution of the compound in the water.

In moving watercourses, water flow may be employed to distribute the allyl hydrazine compound. Thus, the toxicant may be introduced into the water in such manner that it is distributed into and over the plant growth area for a sufficient exposure time to kill the plants.

In an alternative procedure, the treatment may be applied over winter ice by distributing thereupon pellets comprising the present allyl hydrazine herbicide and an inert herbicide carrier, and, if desired, a wetting and dispersing agent of the sort described. In such granular or pellet compositions, the carrier may be so chosen as to provide for a relatively fast or slow release of the allyl hydrazine compound upon contact of the pellet with water.

The following examples illustrate the invention but are not to be construed as limiting:

*Example 1*

In a representative operation, 0.4 part by weight of allyl hydrazine, 10 parts of a xylene solution containing 0.1 percent by weight of a dimeric alkylated aryl polyether alcohol (Triton X-155) and 90 parts of water were mixed together to provide a liquid water-dispersible concentrate. This concentrate was further diluted with water to prepare aqueous compositions containing 100, 50 and 25 parts of toxicant per million parts by weight of combined toxicant concentrate and water. These compositions were employed for the treatment of Ceratophyllum sp., *Cabomba caroliniana* (Cabomba), *Salvinia rotundifolia* (Salvinia), *Lysimastrum nummularia* (moneywort) and Anacharis spp. (waterweed) growing in a series of small tanks. In such operations, the aqueous compositions were poured into the tanks to expose the plants to concentrations of 100, 50, and 25 parts by weight of allyl hydrazine per million parts of composition. After two hours of exposure, the tanks were flushed and refilled with fresh water. Thereafter, the water was changed daily by over-flow filling. Other tanks containing the named species were left untreated to serve as checks.

At regular intervals, observations were carried out to ascertain what control of growth had been obtained. Three weeks following the treating operations, the observations showed the controls of the growth of the named plant species as set forth in the following table.

| Concentration of Allyl Hydrazine as Parts by Weight Per Million Parts of Aqueous Dispersion | Percent Kill of Named Plant Species at Indicated Concentration | | | | |
|---|---|---|---|---|---|
| | Cabomba | Salvinia | Money-wort | Water-weed | Cerato-phyllum |
| 100 | 100 | 100 | 100 | 100 | 100 |
| 50 | 100 | 100 | 100 | 100 | 100 |
| 25 | 100 | 100 | 100 | 100 | 100 |

At the time of observation, the untreated check tanks were found to support luxurious and succulent growth of the named plant species.

*Example 2*

In a further operation, 0.4 part by weight of allyl hydrazine, 10 parts of a xylene solution containing 0.1 percent by weight of a dimeric alkylated aryl polyether alcohol (Triton X-155) and 90 parts of water were mixed together to provide a liquid water-dispersible concentrate. This concentrate was further diluted with water to prepare aqueous compositions containing 10 parts of toxicant per million parts by weight of combined toxicant concentrate and water. These compositions were employed for the treatment of Ceratophyllum spp., *Cabomba caroliniana* (Cabomba), *Lysimastrum nummularia* (moneywort) and Anacharis spp. (waterweed), growing in a series of small tanks. In such operations, the compositions were poured into the tanks and the plants exposed to the compositions for 24 hours. Thereafter, the tanks were flushed and refilled with fresh water which was changed daily by overflow filling. Other tanks containing the named species were left untreated to serve as checks.

At regular intervals observations were carried out to ascertain what control of growth had been obtained. Three weeks following the treating operations, the observations showed the controls of the growth of the named plant species as set forth in the following table:

| Concentration of Allyl Hydrazine as Parts Per Million Parts by Weight of Composition | Percent Kill of Named Plant Species at Indicated Concentration | | | |
|---|---|---|---|---|
| | Cabomba | Money-wort | Water-weed | Cerato-phyllum |
| 10 | 95 | 95 | 90 | 100 |

At the time of observation, the untreated check tanks were found to support luxurious and succulent growth of the named plant species.

*Example 3*

Fifty parts by weight of allyl hydrazine and 5 parts by weight of Triton X-155 are mixed and blended together to prepare a water dispersible concentrate composition.

Also an emulsifiable concentrate is prepared by mechanically mixing and blending together 25 parts by weight of allyl hydrazine, 10 parts by weight of Triton X-155, and 65 parts by weight of xylene.

In a similar manner, 5 parts by weight of allyl hydrazine, 81 parts of fuller's earth, 2 parts of an alkyl aryl sulfonate (Nacconol NR) and 2 parts of a polymerized sodium salt of a substituted benzoid alkyl sulfonic acid (Daxad No. 27) are mechanically mixed and ground together to prepare a concentrate composition in the form of a wettable powder.

Also, 20 parts by weight of allyl hydrazine, 10 parts of Triton X-155, and 200 parts of water are intimately mixed and blended together to prepare a water-dispersible liquid concentrate composition.

These concentrate compositions or aqueous dispersions thereof in a small quantity of water are adapted to be employed to distribute growth inhibiting amounts of the allyl hydrazine compound in water environing aquatic weeds.

I claim:
1. A method useful for controlling the growth of aquatic plants which includes the step of contacting the submersed portions of the plants with a growth-inhibiting amount of allyl hydrazine.
2. A method useful for controlling the growth of aquatic plants which includes the step of introducing into water in contact with the submersed portions of the plants at least 1 part by weight of allyl hydrazine per million parts of water.
3. A method useful for controlling the growth of aquatic plants which includes the step of introducing into the water in contact with the submersed portions of the plants a composition comprising allyl hydrazine as an active ingredient in intimate admixture with a herbicide adjuvant, said composition being employed in an amount sufficient to supply at least one part by weight of the allyl hydrazine per million parts of water.
4. A composition which comprises from 1 to 30 percent by weight of allyl hydrazine as an active ingredient in intimate admixture with a particulate solid material as carrier therefor.
5. A composition which comprises from 30 to 99 percent by weight of allyl hydrazine as an active ingredient in intimate admixture with an emulsifying and dispersing agent.

References Cited in the file of this patent
UNITED STATES PATENTS

| | | |
|---|---|---|
| 2,802,021 | Heininger | Aug. 6, 1957 |
| 2,835,703 | Caldwell et al. | May 20, 1958 |
| 2,855,435 | Grillot et al. | Oct. 7, 1958 |

OTHER REFERENCES

Beilstein's Handbuch der Organischen Chemie, Erstes Erganzungswerk, Band No. 3-4, System Number 199-448, page 562 (1929).

Thompson et al., in "Bontanical Gazette," vol. 107, pages 475 to 507 (1946) (page 501 particularly relied on).